Dec. 8, 1936.  R. S. HUNTER  2,063,551
PHOTOMETRIC DEVICE
Filed March 3, 1934   3 Sheets-Sheet 1

Inventor
Richard S. Hunter
By Walter W. Burns
Attorney

Dec. 8, 1936.  R. S. HUNTER  2,063,551
PHOTOMETRIC DEVICE
Filed March 3, 1934  3 Sheets—Sheet 2

Inventor
Richard S. Hunter

By Walter W Burns
Attorney.

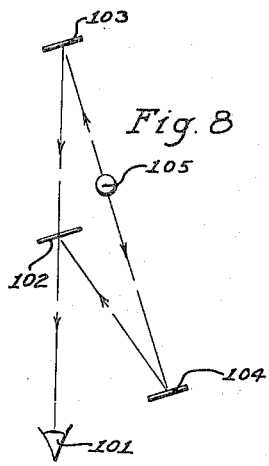
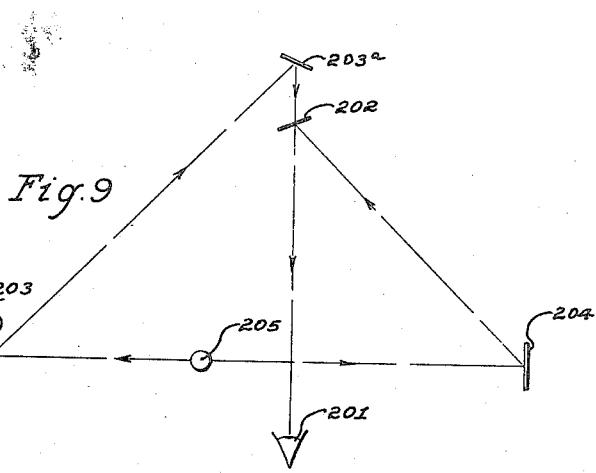
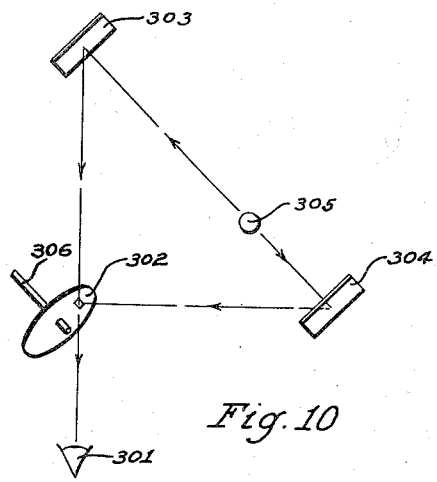
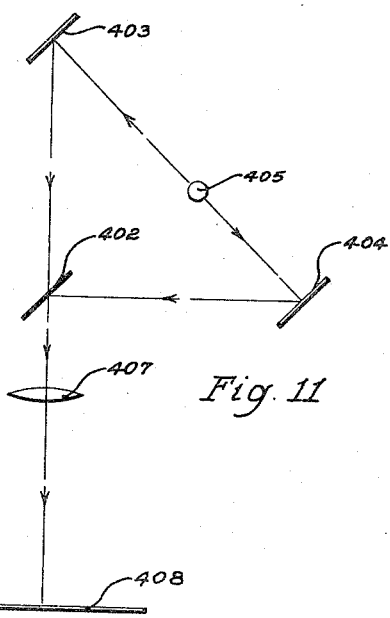
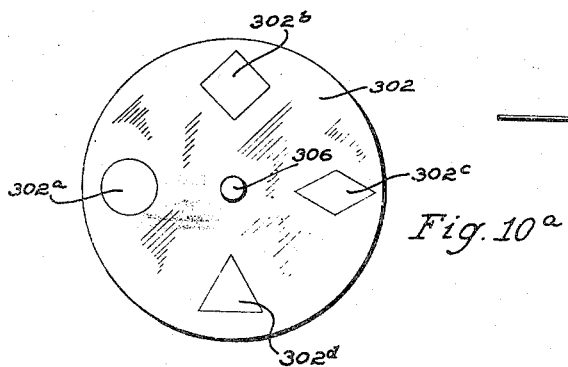

Patented Dec. 8, 1936

2,063,551

UNITED STATES PATENT OFFICE 2,063,551

PHOTOMETRIC DEVICE

Richard S. Hunter, Fairfax County, Va.

Application March 3, 1934, Serial No. 713,933

5 Claims. (Cl. 88—14)

This invention relates to photometric devices and particularly to photometers for measuring and comparing light characteristics.

In the manufacture of articles and compositions which require the production of goods of constant and predetermined appearances there has arisen the need of suitable photometric equipment to measure the light reflecting and transmitting characteristics of such articles. Many photometric devices have been proposed and some adopted by the industries, but the high cost of many of these devices and the professional skill required to operate and keep in operating order these instruments has in general kept the photometer as a physical instrument, out of the reach of industry.

The primary object of this invention is the provision of an improved photometer.

Another object of the invention is the provision of an improved photometer having a scratched or pattern mirror for bringing light characteristics to the eye from two different secondary light diffusing sources illuminated by one and the same primary source.

A further object of the invention is the provision of a photometer utilizing a scratched or pattern mirror to bring light values or characteristics from two diffusing surfaces and having a movable light source to vary the light intensities brought to the eye through the medium of the pattern mirror.

A still further object of the invention is the provision of an improved simplified photometer which operates on the principle of zero contrast or the apparent disappearance of the lines of demarcation between two adjacent surfaces.

A still further object of the invention is the provision of a photometer utilizing a scratched or pattern mirror to bring light values or characteristics from two diffusing surfaces so that they may be viewed in juxtaposition over the boundaries of the pattern mirror and having a movable light source to vary the light intensities from the two surfaces.

A still further object of my invention is the provision of an improved simplified photometer without the use of lenses, or other ground optical parts.

A still further object of my invention is the provision of a photometric device which in one of its adaptable forms will provide an accurate means by photometric control of two light beams for the comparison of:—

(a) Specular reflections or glosses (glossinesses).

(b) Diffuse reflections or brightnesses or values.

(c) Transmission factors of transparent media.

(d) Opacities of semi-transparent media.

(e) Colors of reflecting or transmitting materials.

(f) Light reflecting or transmitting characteristics for the various portions of the color spectrum which may be isolated by means of color filters.

A still further object of the invention is the provision of a photometer by which personal psychological tests may be made by using controllable contrasts of color and brightness.

A still further object of the invention is the provision of a photometer by which color and brightness contrasts may be combined and compared and tested in any desired pattern, and in any desired brightness contrast.

A still further object of the invention is provision of a photometer having a moving pattern for comparing or observing brightness and color contrasts in motion.

A still further object of the invention is the provision of a projected photometric field in which photometric patterns may be projected and observed upon a screen.

Referring to the drawings wherein I have illustrated one specific embodiment of my invention:

Figures 2, 2A:
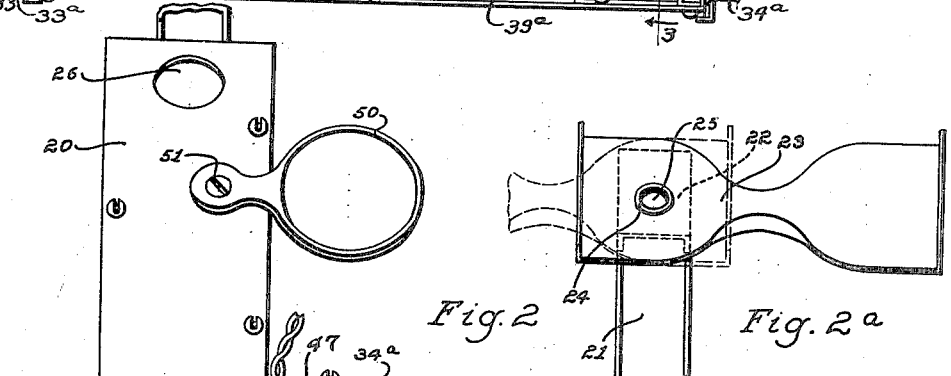
Fig. 2 is a front view, the eye piece being broken away.

Fig. 2ª shows the eye-piece in a position corresponding to Fig. 2.

Figure 1:
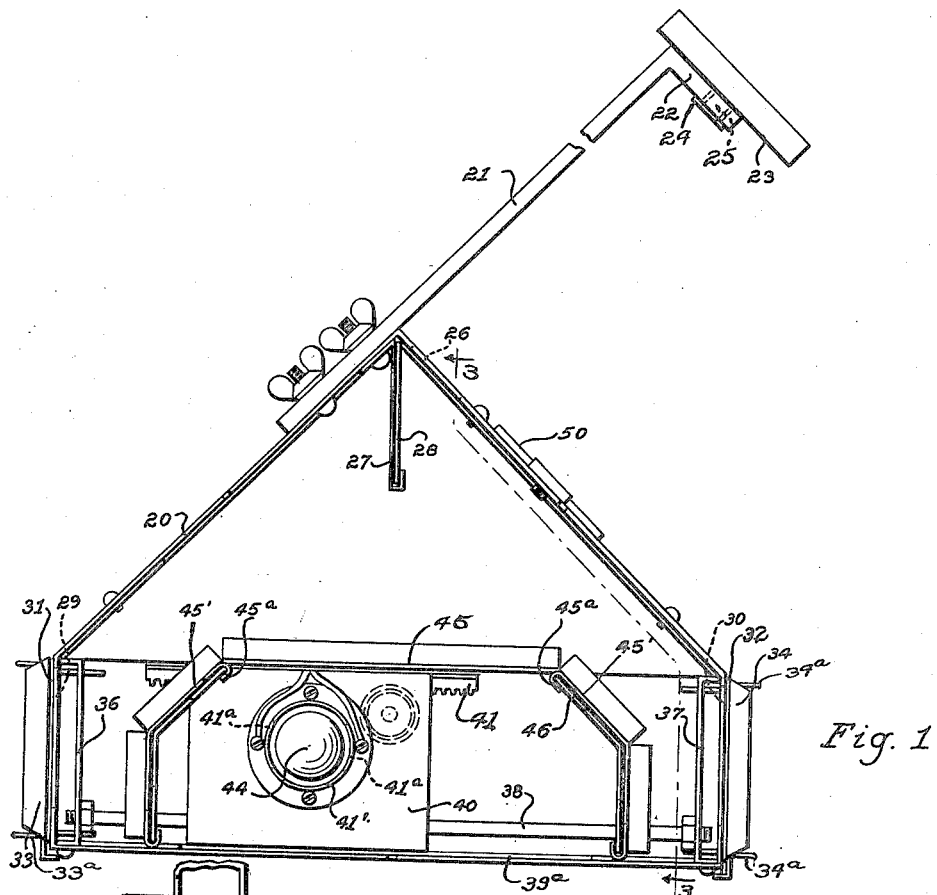
Fig. 1 is a side view of one modification having the side plate removed to show the interior.
Figure 3:
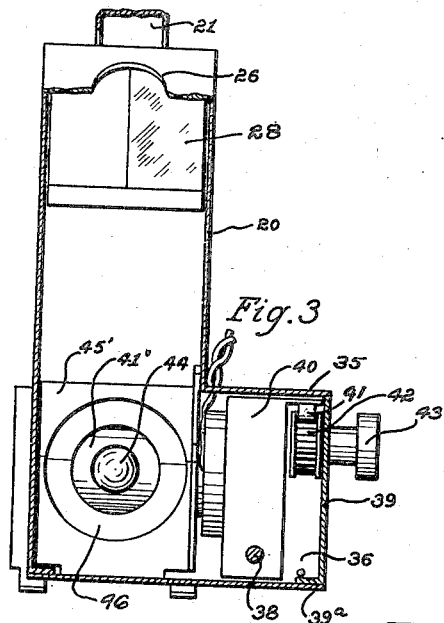

Fig. 3 is a sectional view on the line 3—3 of Fig. 1.

Figure 4:
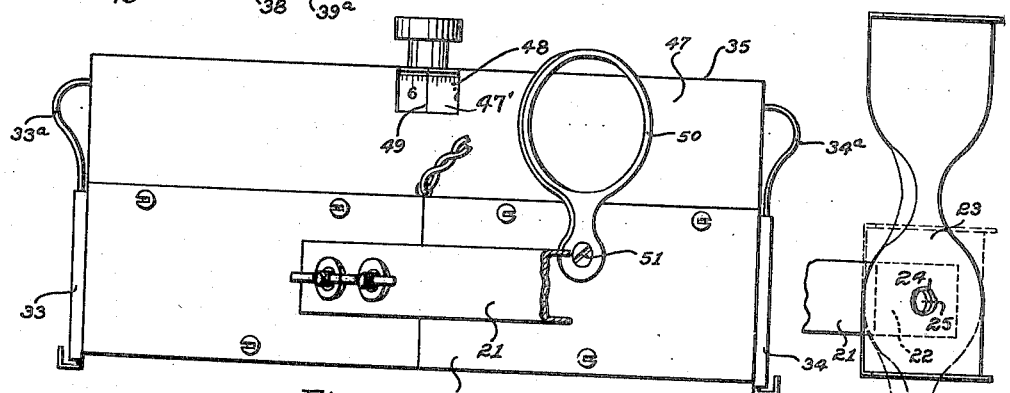

Fig. 4 is a top plan view.

Figures 5, 6, 7:
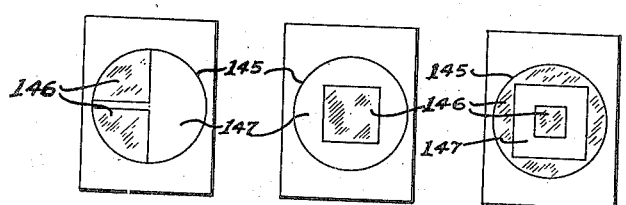

Figs. 5 to 7 are views illustrating some of the designs of pattern or scratched mirrors which I have used.

Figs. 8 to 9 illustrate modified forms of my invention somewhat similar to the form already described.

Fig. 10 illustrates another modified form of my invention showing the pivoted mirror.

Fig. 10ª is an enlarged view of the mirror.

Fig. 11 is still another form of my invention showing the projection lens.

The same reference characters refer to the same or similar parts throughout the specification and drawings.

Referring to Figs. 1 to 4, 20 designates the shell or body portion of my improved photometer. Secured to one side of the sloping top is the arm 21 of the eye-piece holder 22 having at a suitable position an eye-piece 23 which is pivoted to the eye-piece holder 22 by a hollow rivet 24 having an opening 25 therein through which observation is had during the operation of the instrument. The eye-piece 23 may be turned to either side and is so shaped that when on one side or the other, the eye not being used for sighting into the instrument, may be shielded from viewing exterior objects.

This allows for unimpaired observation while both eyes are open the observer having his choice as to which eye he shall use for observing. In one sloping side of the top, is an opening 26, through which observation is had to the interior of the body portion. At the apex of the sloping sides of the top and within the body portion is holder 27 for carrying the scratched or pattern, mirror 28.

Figs. 5, 6 and 7 illustrate modified forms of the pattern mirror wherein the field of vision 145 has a metallic reflecting surface 146 and a clear portion 147.

In the embodiment illustrated, the ends are provided with openings 29, 30. The planes of the respective openings 29, 30 are parallel to the mirror 28.

Outside the openings 29, 30 are placed the reflecting samples 31, 32, so as to be seen through the respective openings 29, 30. Spring-pressed sample holders are provided at 33, 34 to hold the respective samples 31, 32 in place over the openings 29, 30. The springs 33ª, 34ª, are secured at one end to the holders 33, 34 and at their other ends to the body portion 20.

It will be understood that at times, the instrument will be placed against the sample or the sample would be held against the instrument. In this case, the sample holder is removed and the adjacent part of the frame utilized as a means for indicating the position at which the sample is to be placed.

The two reflecting samples, 31, 32, are illuminated by opposite sides of the same light source. Motion of the light source along a line through these samples provides varying illuminations upon the diffusely reflecting surfaces of samples 31, 32. The position of the source relative to these two sample surfaces will determine the illumination upon them as demanded by that law of photometry known as the inverse square law and its modifications for sources of finite size.

In the present embodiment, I provide a single electric light in a position to shine directly upon the exposed surfaces of the samples 31, 32. To support this light source I have provided supporting and measuring devices to facilitate adjustment and determination of the position of the source of light without opening the casing or shell portion.

To provide space for the supporting and adjusting means for the source of light, I have extended the body portion as shown in Figs. 2, 3 and 4. This extension I have designated at 35. Within the extension 35, at the ends, are two channels 36, 37. A rod 38 is secured at its ends to the channels 36, 37.

The side plate 39 has a flange 39ª by which it is held in place.

The light carriage 40, carried by the rod 38, is provided with a rack 41 which meshes with a gear 42. The gear 42 is provided with a handle 43 which is located on the side of the extension 35. By turning the handle 43, the light carriage 40 is moved along the rod 38.

On the side of the carriage 40 extending therefrom, is the light shield 41'. This light shield is provided with openings 41ª in position to permit light to pass from the electric light 44 through the shield and in directions towards the samples 31, 32. The light bulb 44 is usually frosted to avoid lens effects. Surrounding the shield 41' is a box 45 which has openings 45' on a line between the light 44 and the samples 31, 32. Adjacent the openings 45' are guides 45a in which are placed diaphragms 46. These diaphragms have openings of the desired size in registry with the openings 45' to transmit the desired amount of light from the source to the samples 31, 32. This feature may be omitted if desired, the openings 45' being of the proper size to produce the desired result.

The top 47 of the extension 35 is provided with an opening 47' through which may be seen a scale 48. The scale 48 is mounted on and moves with the carriage 40. A transparent scale cover, having an index line 49, is mounted in the opening 47' and serves to keep the scale clean and provide a means for accurately measuring the position of the light 44, relative to the samples 31, 32.

In order to clearly see the fine readings on the scale 48, I provide a magnifying glass 50 which is secured to one of the sloping sides of the top of the shell 20, as at 51.

The light 44 is provided with suitable wires to conduct the electricity to the lamp.

My photometer operates upon a null method. In operation a sample which may be a standard sample, and with which it is desired to compare another sample, is placed in the holder 34, the other sample being placed in the holder 33. The eye of the operator is placed to the eye-piece 23, the operator looking through the opening 25 at the mirror 28. Through the portions of the mirror from which the silver has been removed, the light comes diffusely reflected from the surface of the sample 31 held by the holder 33. The diffusely reflected light from the surface of the sample 32, held by the holder 34, comes similarly to the eye by way of those portions of the pattern mirror from which the reflecting surface has not been removed. As the light source illuminates the two samples normally, light will be transmitted to the eye as already described. The operator now turns the knob 43. The carriage 40 moves the light source 44, varying the illuminations upon the sample surfaces, one inversely with the other.

That is, since the light source is between the two samples, movement from one sample is a movement toward the other. With this movement of the light, the intensities of the light from the two samples, which reach the eye of the operator, will change. A criterion for setting which is characteristic of all photometer fields of the type described here is that like intensities for the two components of the field are sharply recognized when they occur. When the lines of demarcation in the pattern disappear or most nearly disappear, and the whole field of vision on the mirror appears the same, or most nearly the same except for color differences, then the reading of the scale 48 gives a value of the relative diffuse reflection characteristics of the two samples.

The embodiment just described serves to measure the ratio of reflection coefficients for two samples illuminated normally and viewed at an angle of 45° from the normal to their surfaces.

The type of mirror and the configuration of the pattern in the mirror may be varied to suit the needs of the problem and the convenience of the operator.

The mirror may have its silvering removed in portions or simply have the edge brought up to a position partially across or adjacent to the field of vision of the operator as one of the samples is directly observed. The actual preparation of the pattern or scratched mirror may be made by scraping a portion of the silvering from the mirror as by a chisel or safety razor blade.

In observing with my invention, one illuminated surface is seen through the uncovered portion of the mirror as a pattern or in contact with the reflected image of the other illuminated surface. As the light is moved toward one illuminated surface and recedes from the other, the illuminations upon the two surfaces will vary inversely as the squares of the respective distances between the light and the surfaces illuminated.

By moving the light, a point may be found where the outline between the patterns of the fields of vision will disappear. The reading of the scale opposite the index gives the measure of the illuminations upon the two surfaces and thus is given the relative light reflecting or diffusing powers of the two surfaces.

It is this comparison which is useful in industry.

In selecting a metallic surface for my pattern or scratched mirror, I find that it is often desirable to use a material for color work, which is non-selective. The specular reflection from silver is yellow. However many alloys of aluminum are non-selective. Mach's metal or magnalium is probably the best known of these.

The embodiment of my invention already described is a reflectometer of the 45° right triangle type.

There are however other adaptations of the invention which may by modification be used as a reflectometer and for other purposes.

In Fig. 8, I have illustrated diagrammatically a modified form in which an isosceles triangle other than 45° is used. In this view, the eye at 101 looks toward the pattern or scratched mirror 102 and sees one illuminated surface 103 through or past the mirror surface and also sees the reflection of the illuminated surface 104 in the portion of the mirror from which the metallic surface has not been removed.

In Fig. 9, I have illustrated diagrammatically a form of the invention wherein the eye piece 201 is in front of the scratched or pattern mirror 202 which receives reflected light from the sample 204 and reflects the light to the eye along lines parallel to the light received from the illuminated sample 203.

This light is reflected from the mirror 203a and through the pattern or scratched portion of the mirror 202 and to the eye at 201.

The operation of the devices illustrated diagrammatically in Figs. 8 and 9, is similar to the device of Figs. 1 to 4, the light source 205 which illuminates the surfaces 203, 204 being adjustable along a line passing through these two illuminated surfaces.

In the form of my invention illustrated diagrammatically in Fig. 10, the eye piece 301, the samples 303, 304 and the source of light 305 correspond to the parts 101, 103, 104 and 105 of Fig. 8.

The mirror 302 in this instance is mounted on a pivot 306 and as shown in Fig. 10a may have several cut out or scratched portions 302a, 302b, 302c, 302d, of the shape of a circle, square, diamond and triangle respectively. These shapes are, of course merely illustrative. The purpose of this pivoted mirror may be two-fold:—either for use as a variable mirror, stopping the mirror at the desired place, or as a revolving mirror for observation during rotation. In this latter use as in a psychological test, the mirror would appear to be at rest when the light source 305 was at the proper adjustment.

In Fig. 11, I have illustrated diagrammatically my invention when used to project the light reflected from the samples, upon a screen. In this way a large number of people may use the same device.

The mirror 402, here shown is similar in construction and operation to the mirrors 102 and 202 and receives light reflected from the sample 404 which is illuminated by the light source 405 which also illuminates the sample 403. The latter is on a line through the mirror 402 from the screen 408. The parts are so arranged that the light reflected from the sample 404 and the light coming directly from the sample 403 will come to the position of, and will pass through the lens 407 to the screen 408. The projecting lens 407, at its suitable position, takes the place of the eye-piece 23 already described. By making the samples, mirror and lens of proper sizes, the pattern of the mirror will be thrown on the screen. By adjusting the light 405 toward one sample and away from the other, the pattern from the scratched or pattern mirror will be made to disappear.

While I have described in detail embodiments of my invention, I desire to have it understood that modifications and changes may be made without departing from the spirit of the invention and within the scope of the appended claims.

I claim:

1. A portable photometer comprising a substantially light-tight housing, an eye-piece mounted thereon, means on the housing for supporting two parallel diffuse reflecting surfaces, a light source located between the surfaces, guide means carried by the housing for supporting the light source in slidable adjustment toward and from the surfaces, and a pattern mirror secured within the housing, in position to pass light from one surface directly to the eye-piece and to receive light directly from the other surface and reflect it directly to the eye-piece.

2. A portable photometer comprising a substantially light-tight housing, an eye-piece mounted thereon, means on the housing for supporting two diffuse reflecting surfaces, a pattern mirror mounted in the housing and in a line between the eye-piece and one of the surfaces, to pass light directly from that surface through the mirror directly to the eye-piece and in position to receive light directly from the other surface and reflect it directly to the eye-piece, means mounted in the housing for illuminating the surfaces and means for varying the relative illumination of the reflecting surfaces to change the relative amounts of light transmitted to the eye-piece from the transmitting and reflecting portions of the pattern mirror.

3. A portable photometer comprising a substantially light-tight housing, an eye-piece mounted thereon, means on the housing for supporting two diffuse reflecting surfaces, a pattern mirror mounted in the housing and in a line between the eye-piece and one of the surfaces, to pass light directly from that surface through the mirror to the eye-piece and in a position to receive light directly from the other surface and reflect it directly to the eye-piece, means mounted on the housing for illuminating the surfaces, means for varying the relative illumination of the reflecting surfaces to change the relative amounts of light transmitted to the eye-piece from the transmitting and reflecting portions of the pattern mirror and means for supporting the mirror for movement in its plane.

4. A portable photometer comprising a substantially light-tight housing, means on the housing for supporting two diffuse reflecting surfaces, a pattern mirror mounted in the housing and in a line between one of the surfaces and a position, to pass light from that surface directly to the position and to receive light directly from the other surface and reflect it directly to the position along lines adjacent the unreflected rays, means mounted in the housing for illuminating the surfaces and means for varying the relative illumination of the reflecting surfaces to change the relative amounts of light transmitted to the position along the unreflected and reflected lines.

5. A portable photometer comprising a substantially light-tight housing, means on the housing for supporting two diffuse reflecting surfaces, a pattern mirror mounted in the housing and in a line between one of the surfaces and a position, to pass light directly from that surface to the position and to receive light directly from the other surface and reflect it directly to the position along lines adjacent the unreflected rays, means mounted in the housing for illuminating the surfaces, means for varying the relative illumination of the reflecting surfaces to change the relative amounts of light transmitted to the position along the unreflected and reflected lines and a projecting lens at the said position to receive and project the light from the surfaces upon a screen.

RICHARD S. HUNTER.